May 22, 1956 R. A. HUDSON 2,746,049
HELMET
Filed Nov. 23, 1951 2 Sheets-Sheet 1

INVENTOR.
RAYMOND A. HUDSON
BY Gregory S. Dolgorukov
ATTORNEY

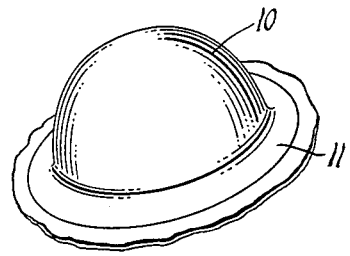
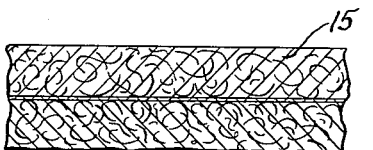
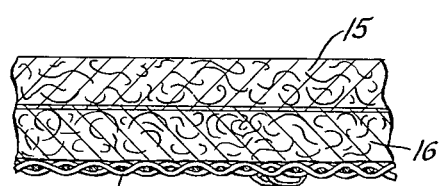
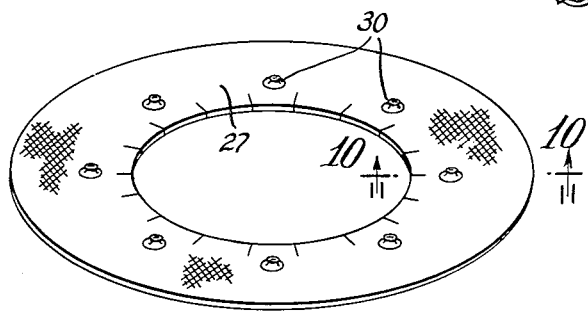
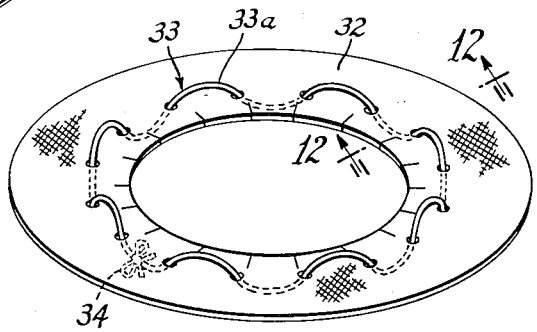
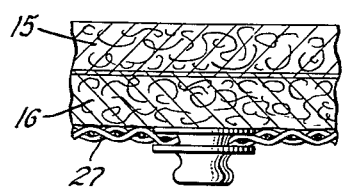
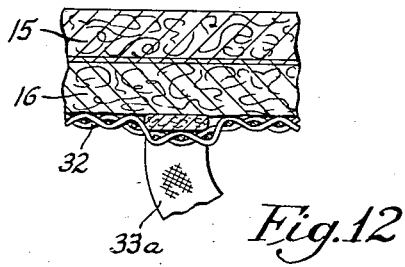
INVENTOR.
RAYMOND A. HUDSON United States Patent Office 2,746,049
Patented May 22, 1956

2,746,049

HELMET

Raymond A. Hudson, Birmingham, Mich., assignor, by mesne assignments, to Willson Products, Inc., Reading, Pa., a corporation of Pennsylvania Application November 23, 1951, Serial No. 257,828

3 Claims. (Cl. 2—3)

This invention relates to an improved helmet or safety hat made from fibrous formable material bonded with plastic material, particularly phenolic and polyester resins.

At the present time such helmets are made largely from resin impregnated fabric such as duck cloth or similar material impregnated with phenolic resin and molded under heat and pressure in suitable molding apparatus.

While use of woven materials has been extensively employed, the advantages of the use of fibrous materials has been recognized for many years, and making helmets or safety hats from fibrous formable materials bonded with plastic is an old art dating back more than a half century. One of the early uses of such materials was in miner's caps made from felt bonded with shellac. Such helmets were used by Welsh miners nearly 75 years ago. However, lack of proper fibrous materials and resins, made such hat less practical than those made from woven materials, and for a number of years use of woven materials prevailed in the art. With the development of better fibrous materials, and particularly those that would not burn in a mold, and of phenolic resins and methods of molding such materials, such materials and methods have been applied with success to safety helmets. U. S. Patent No. 1,835.833 to Lewis, while directed primarily to the use of a helmet made from woven material, teaches the use of fibrous materials as formable material.

As improved fibrous materials were developed, such materials were employed quite naturally in molding safety helmets. One type of such materials already formed to approximately helmet shape has been commercially available, under the name "Durez," to manufacturers of helmets. With such materials available, methods such as disclosed in said patent to Lewis were employed. A similar method is also described in the U. S. Patent No. 2,295,855 to Ludwell.

It was found, however, that while the use of improved fibrous materials and resins had advantages in such applications and afforded opportunities for improving safety helmets, conventional methods such as the one described in said patent to Ludwell had a number of serious disadvantages. It was found, for instance, that the mats of such fibrous materials made by blowing loose fibers through a tube on a wire screen shaped to approximate helmet shape were producing helmets with relatively weak brims. In such helmets the weakness of the brim resulted primarily either from insufficient amount of fibrous material therein or excessive amount of resin which taken by itself is very brittle. In addition, the use of solid metal dies for molding such helmets caused "crushed spots" in places where a bundle or a knot in the fibers would produce a high spot that would be squeezed hard by the dies driving out most of the resin from such a spot and crushing the fibers. In other words, the distribution of the fibrous and resin material was not uniform throughout the helmet structure and caused production of helmets of uneven strength throughout the structure thereof.

One of the objects of the present invention is to provide an improved helmet whereby the disadvantages of prior constructions are overcome and largely eliminated.

Another object of the present invention is to provide an improved safety helmet made from fibrous material bonded with polyester or phenolic resins, or other suitable plastic material, in which helmet the brim portion thereof possesses required strength without making the entire helmet too heavy.

Another object of the present invention is to provide an improved safety helmet in which the fibers of the formable material do not extend throughout the entire thickness of the helmet wall, thereby producing a helmet of improved load-carrying characteristics, and of superior electrical insulation properties, particularly under conditions of high humidity.

A further object of the present invention is to provide an improved safety helmet made from fibrous material bonded with polyester or phenolic resin or other suitable plastic material, in which the outside of the helmet may be made of one color and the inside of the helmet in another color without the necessity of painting the inside and the outside surfaces of the helmet.

A still further object of the present invention is to provide an improved helmet made of fibrous materials and so reinforced with woven material as to produce a greatly superior helmet, with reinforcements of woven material being such as to utilize such material efficiently without excessive scrap.

A still further object of the present invention is to provide an improved safety helmet specified in the preceding paragraph and having suspension-supporting means embedded in the helmet shell and fully covered at the outer surface of the helmet, thus providing improved electrical insulation between the outer surface of the helmet and the wearer's head.

It is an added object of the present invention to provide an improved helmet of the character specified above, which is simple in construction, dependable in use, and is relatively inexpensive to manufacture.

Further objects and advantages of this invention will be apparent from the following description and appended claims, reference being had to the accompanying drawings forming a part of this specification, wherein like reference characters designate corresponding parts in the several views.

Fig. 6 shows a molded helmet shell as it comes out from the mold but before it is trimmed.

Fig. 7 shows somewhat diagrammatically a section through the helmet shell portion made of fibrous materials only.

Fig. 8 is a view similar to Fig. 7 but showing a section through a helmet shell portion having reinforcement of woven material.

Fig. 9 shows a method of embedding in the helmet shell snap fasteners for connecting a suspension to the helmet shell.

Fig. 10 is a sectional view taken in the direction of the arrows on the section plane passing through the line 10—10 of Fig. 9.

Fig. 11 is a perspective view showing a method of embedding suspension cord in the helmet shell.

Fig. 12 is a sectional view taken in the direction of the arrows on the section plane passing through the line 12—12 of Fig. 11.

Figure 1:
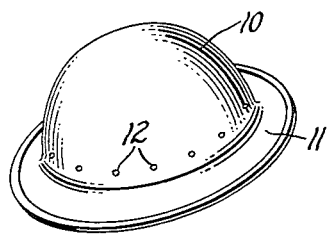
Fig. 1 is a perspective view showing a helmet shell embodying the present invention.
Figure 2:
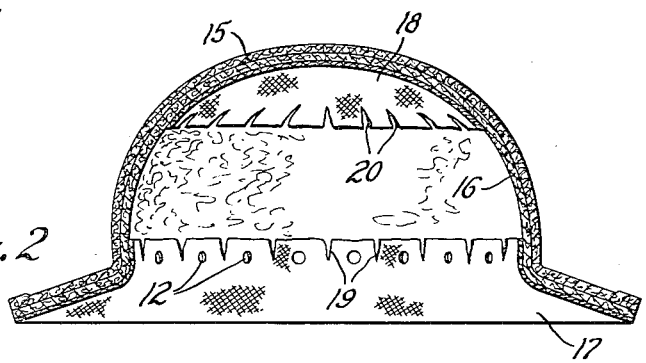
Fig. 2 is a longitudinal sectional view of the helmet shell shown in Fig. 1, the thickness of the separate layers of material being somewhat exaggerated for the sake of clarity of the drawing.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention, I have completely discarded the old practice of molding helmets from a single layer or mat of unwoven fibrous material, since the claimed advantage of some of the strands of the fibrous material extending across the thickness of the body for providing a bond between the inner and the outer surfaces of the helmet wall is not justifying the disadvantages resulting from the use of a single layer or mat. In accordance with the invention, I provide at least two such mats and select them in pairs to have one mat of a pair to be thick at the center and the other mat of the pair to be thicker around its periphery, or in general to have their thick or thin portions out of registry. In accordance with the invention, such mats may also be produced in a predetermined manner such as by blowing loose strands and depositing them on a concave wire screen to produce a mat thicker at the center, and producing complementary mats by blowing the fibrous material and depositing the same on a convex wire screen. With such a construction, not only uniform thickness and strength of the helmet is ensured, but the strength of the helmet may be controlled in any described manner and particularly to ensure a helmet having a sufficiently strong brim, without impairing the strength of the helmet dome or making the entire helmet too thick and heavy.

Moreover, I find it desirable, and in many cases critically important, to provide a brim piece of woven material covering the grim from the inside and extending sufficiently far into the crown of the helmet to provide reinforcement for the juncture of the crown and brim, which juncture is usually weakened by holes drilled for connecting suspension to the helmet. Similarly a piece of woven material may be also molded into the dome of the helmet. It is preferable to have the brim piece in an annular or ring shape with the center cut out, the cut out piece being used as the dome piece. The pieces of woven material may be made of different colors than the outside of the helmet. For instance, in a case of a white helmet I prefer to use dark gray or green woven brim pieces, thereby eliminating glare.

In accordance with the invention, molding of the "preform," i. e. assembled mats and pieces, is done in a mold having inner pressure member made of a rubber-like material, whereby crushing of the high spots produced by the reinforcements is completely eliminated, and the helmet is molded under uniform pressure at all of its points, with the high spots extending inwardly of the helmet and absorbed, during molding, by the yielding pressure member. Such result is totally unattainable with the methods used heretofore in molding helmets from fibrous materials.

My molding method has a great advantage in enabling molding in into the helmet shell of metal snap fasteners or a cord providing means for connection of a suspension to the helmet without drilling holes therein. Strenuous efforts have been exerted by those skilled in the art to eliminate the disadvantages of weakening the helmet by such holes, and causing passage of electrical current from the cord to the suspension when the cord becomes wet. In accordance with the invention suspension-connecting means may protrude for a considerable distance inwardly of the helmet and yet be molded in accordance with my improved method without any difficulties.

Figure 3:
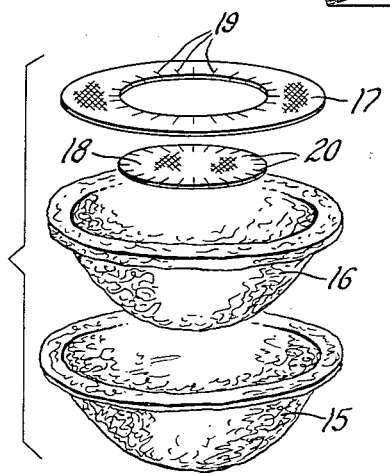
Fig. 3 is an exploded view showing in perspective pieces of woven material and mats of fibrous material used for molding the helmet shell therefrom.
Figure 4:
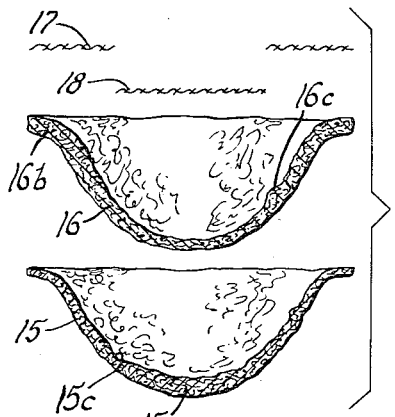
Fig. 4 is a view similar to Fig. 3 but showing the same pieces in section.

In the drawings there are shown, by way of example, helmets embodying the present invention, as well as a molding apparatus for making the same. Referring particularly to Figs. 1–8, the helmet illustrated therein comprises generally a crown portion 10 and a brim portion 11; holes 12 are provided near the lower edge of the crown portion 10 for passing suspension cord therethrough in a manner well known in the art. Referring to Figs. 3 and 4, the parts of the preform illustrated therein comprise a mat 15 having a thicker central portion as indicated at 15a, and a mat 16 having thicker peripheral portion as indicated at 16b. Because of production imperfections, the mats may also have thick and thin spots occurring at various places. Such spots, indicated in Fig. 4 at 15c and 16c, are arranged in assembling the preform to be out of registry, i. e. thin (or thick) spots of both mats are not placed one over the other. An annular brim piece 17 with its center cut out to form a dome-reinforcing piece 18 is provided, said piece being made of woven material such as duck cloth, or canvas, or cloth made from spun glass. The brim piece 17 is slit for a short distance around its inner edges as shown at 19, while the dome piece 18 is similarly slit along its outer edges as indicated at 20. The fibrous material used for forming mats 15 and 16 may be of any suitable character, such as sisal, loosely felted into approximately helmet shape, as shown, by blowing unto a wire screen or otherwise laid in a loose unoriented relation. Spun glass may also be used with success under certain conditions, particularly when high degree of electric insulation is desired and the weight of the helmet is not of a critical importance.

In molding the helmet, the mats 15 and 16 are placed into the cavity of a metal mold 25, and a measured quantity of liquid resin is poured into the mold. If desired, said measured quantity (which may be experimentally determined) is separated into several portions, and one of said portions is poured in first, with other portions being poured in as the mats are placed into the mold, to ensure proper penetration of the plastic throughout the entire thickness of the preform.

Figure 5:
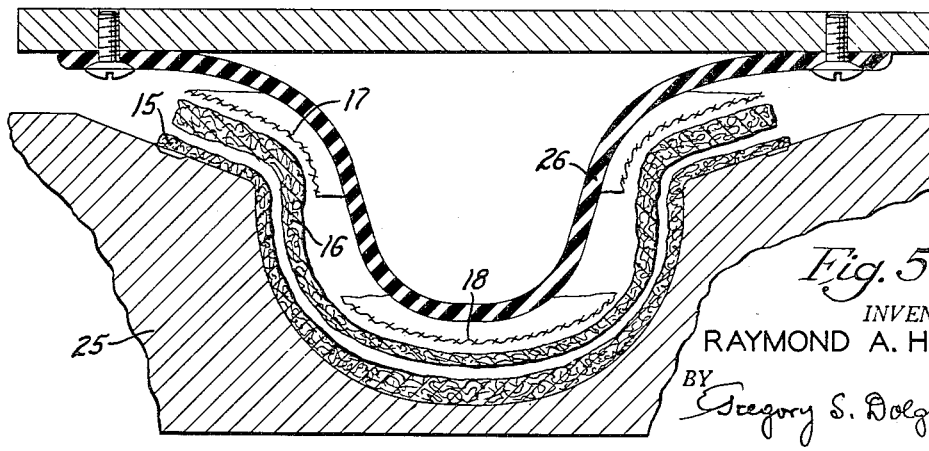
Fig. 5 is a mold used for molding the helmet shell from pieces shown in Figs. 3 and 4, in accordance with the method embodying the present invention.

The dome piece 18 is thereupon placed at the bottom of the mat 16, and the brim piece 17 is arranged over the brim portion of the mat 16, as shown in Fig. 5. Under certain conditions it is advantageous to assemble the entire preform outside of the mold. The metal mold 25 is maintained at a predetermined temperature determined by the nature of the resin used. The pressure member 26 is thereupon lowered into the cavity, and suitable fluid pressure is applied to expend said member and exert molding pressure on the preform. Similarly to temperature, the pressure used in molding is determined by the nature of the resin used. I prefer to use the pressure of approximately 200 pounds per sq. in. and temperature of approximately 300° F. With certain types of resin such as polyester resins, a molding period of approximately 5 minutes gives very good results. With certain types of resins, heating of the mold over the room temperature is not necessary, and the pressure employed may be only as high as necessary to impart the desired form to the helmet and ensure penetration of the mats by the resin.

After the molding process is completed, the pressure is relieved and the member 26 is raised. The molded preform, usually having an appearance such as shown in Fig. 6, is thereupon removed from the mold.

It will be understood that raising and lowering of the member 26 may be done in any suitable manner, usually by attaching it to the movable ram of a suitable molding press.

The molded preform is thereupon trimmed in any suitable manner, and holes 12 are drilled or punched therein for passing a suspension cord.

It is very important to appreciate that with the helmet so molded the fibers of the mats 15 and 16 are not pressed or intermingled to the extent that fibers of one mat penetrate through the entire thickness of the other mat, but terminate at the surface of the other mat. Such a condition is illustrated in Figs. 7 and 8. It will also be appreciated that any raised spots that may occur in the preform due to rearranging reinforcements, or providing additional reinforcements, will not be crushed by the pressure member 26 but absorbed thereby in the process of molding.

It will be understood that while two mats of unwoven fibrous material and two pieces of woven material are shown in the drawing, a greater number of such mats and pieces may be utilized to suit particular requirements of the helmet strength. It will be further appreciated that rearranging such pieces and changing the thickness of the helmet wall in a desired manner does not require refitting the inner pressure member, as is required when solid dies are used. Furthermore, use of woven pieces may be dispensed with, or instead of woven material such as fabric, leather, paper, or sheet plastic be used.

It has been appreciated in the art that with a suspension-supporting cord passed through holes provided in the helmet shell, electric insulation properties of the helmet become greatly impaired. When the cord becomes wet, touching high tension wires with the helmet may cause electric current to pass through the cord and through the suspension to the wearer's head, causing a severe or even a fatal electric shock. In accordance with the invention such a disadvantage of the prior helmets is eliminated by molding in suspension-supporting means between the fibrous material and the woven brim piece. When metal snappers are used, the base portions 30 of such snappers are assembled with a brim piece 27 in which a number of holes is first punched; thereupon such piece with base portions of snappers assembled thereto is arranged in the mold over the brim piece, as described above. With such a construction, suspension of any suitable character (not shown) is provided with complementary snapper portions and is detachably connected to the helmet after molding, with such snappers. Such a construction is illustrated in Figs. 9 and 10.

Fig. 11 illustrates a brim piece 32 provided with a suitable number of holes through which is looped a cord 33, the ends of which being tied as indicated at 34, or otherwise secured together. The portions 33a of the cord 33 protruding inwardly of the helmet (after molding) are treated prior to molding with any suitable material such as oil in order to prevent their being molded to the helmet wall. The piece 32 is arranged and molded in the preform in a manner similar to the piece 17. After molding, a suitable suspension is connected to the loops 33a in a manner well known in the art.

It may be appreciated that with fiber strands extending from the outer surface to the inner surface of the helmet, as in conventional helmets, after the helmet is worn for some time the outer glaze or thin cover of plastic, particularly at crushed spots, wears out or crumbs out in the form of minute crumbs exposing the fibers. With fibers such as sisal, or even with spun glass when several fibers form one strand, the strong capillary action in such a strand draws the moisture in, thus providing a path or conductor for the passage of electric current. This situation is particularly serious in cases of sea water or water having in solution even small quantities of salt (such as regular tap water). Under such conditions the electric insulation qualities presumably built in into such conventional helmets because of the use of such electric insulation materials as spun glass and phenolic resin, are largely destroyed. It is for such reasons that tests of helmets for naval uses include sanding of both outside and inside surfaces of the helmet to be tested and soaking it in water for a considerable period of time, before applying electric current to the helmet.

In my improved helmet, because of the use of a plurality of mats, the path of the fibers from the outer surface to the inner surface of the helmet wall is interrupted by a layer of resin, which layer although relatively thin, serves as an effective electric insulator and, being arranged interiorly of the helmet wall, is protected from wear.

There is thus provided an improved helmet whereby objects of the present invention listed above and numerous additional advantages are attained.

I claim:

1. A helmet molded under heat and pressure from at least two plastic-treated mats of fibrous material, said mats being formed to approximate shape of the helmet, and a brim piece of woven material covering the entire brim portion of the helmet and overlapping with the crown portion thereof, and suspension-connecting means moldably embedded between the fibrous material and the woven material, said suspension-connecting means protruding inwardly of the helmet through said woven brim piece.

2. A helmet molded under heat and pressure from at least two plastic-treated mats of fibrous material, said mats being formed to approximate shape of the helmet, and a brim piece of woven material covering the entire brim portion of the helmet and overlapping with the crown portion thereof, a plurality of snappers moldably embedded between the fibrous material and the woven material and protruding through the woven material inwardly of the helmet, said snappers being adapted to have a suspension connected thereto.

3. A helmet molded under heat and pressure from at least two plastic-treated mats of fibrous material, said mats being formed to approximate shape of the helmet, and a brim piece of woven material covering the entire brim portion of the helmet and overlapping with the crown portion thereof, a cord looped through said piece of woven material and moldably embedded between said piece and the fibrous material and looped inwardly of the helmet for supporting a suspension therein.

References Cited in the file of this patent

UNITED STATES PATENTS

| | | |
|---|---|---|
| 2,115,065 | Dym | Apr. 26, 1938 |
| 2,295,855 | Ludwell | Sept. 15, 1942 |
| 2,420,522 | Le Grand Daly | May 13, 1947 |
| 2,423,076 | Le Grand Daly | July 1, 1947 |
| 2,532,442 | Le Grand Daly | Dec. 5, 1950 |